United States Patent [19]

Tolino et al.

[11] Patent Number: 4,474,398

[45] Date of Patent: Oct. 2, 1984

[54] FUEL ASSEMBLY LOCKING APPARATUS

[75] Inventors: Ralph W. Tolino, Wilkinsburg; Charles E. Toler, Sr., Penn Hills, both of Pa.

[73] Assignee: Westinghouse Electric Corp., Pittsburgh, Pa.

[21] Appl. No.: 277,550

[22] Filed: Jun. 26, 1981

[51] Int. Cl.³ .......................... B66C 5/00; G21C 3/30; G21C 19/34

[52] U.S. Cl. .................................. 294/86 A; 376/261; 376/362; 376/364; 248/544

[58] Field of Search ............... 376/272, 362, 364, 261, 376/262, 264, 268, 269, 270, 271, 461, 260; 29/723, 426.1, 402.6; 294/86 A; 292/202, 54; 269/99, 100; 403/111, 164, 165, 350, 409; 248/500, 544; 211/4, 60 R; 411/340–343

[56] References Cited

U.S. PATENT DOCUMENTS

| | | | |
|---|---|---|---|
| 2,077,140 | 4/1937 | Brantingson | 292/202 X |
| 2,389,184 | 11/1945 | Cooke . | |
| 2,725,993 | 12/1955 | Smith . | |
| 3,051,514 | 8/1962 | Consolloy | 403/350 X |
| 3,690,713 | 9/1972 | Ristow | 376/264 X |
| 3,715,531 | 2/1973 | Keeley | 292/202 X |
| 3,802,996 | 4/1974 | Jones | 376/440 |
| 3,825,359 | 7/1974 | Fulton | 403/350 X |
| 3,855,684 | 12/1974 | Kendall . | |
| 3,917,335 | 11/1975 | Jones . | |
| 3,971,575 | 7/1976 | Lesham et al. | 376/364 X |
| 4,037,978 | 7/1977 | Connelly | 403/164 |
| 4,064,004 | 12/1977 | Long et al. | 376/440 |
| 4,081,086 | 3/1978 | Shallenberger et al. | 376/264 X |
| 4,139,778 | 2/1979 | Raymond | 376/272 |
| 4,289,291 | 9/1981 | Goddard | 376/262 X |
| 4,298,434 | 11/1981 | Anthony et al. | 376/364 |
| 4,356,062 | 10/1982 | Bosshard | 376/272 |
| 4,381,284 | 4/1983 | Gjertsen | 376/364 |

FOREIGN PATENT DOCUMENTS

| | | | |
|---|---|---|---|
| 2742735 | 4/1979 | Fed. Rep. of Germany | 376/272 |
| 2462766 | 3/1981 | France | 376/272 |
| 2462765 | 3/1981 | France | 376/272 |

Primary Examiner—Richard E. Schafer
Assistant Examiner—Daniel Wasil
Attorney, Agent, or Firm—L. A. DePaul

[57] ABSTRACT

The fuel assembly locking apparatus comprises a rotatable plate capable of simultaneously and positively engaging all four legs of the bottom nozzle of a fuel assembly for uniformly holding the fuel assembly while the spent fuel rods are pulled from the fuel assembly. The rotatable plate has four notched corners arranged to be rotated over a ledge on each leg of the bottom nozzle of the fuel assembly thereby preventing movement of the fuel assembly. The rotatable plate is also capable of being rotated 45° so that the four corners of the plate are rotated clear of the legs of the bottom nozzle of the fuel assembly thereby allowing the fuel assembly to be placed on or removed from the locking apparatus. The locking apparatus is also provided with a torque actuator for remotely rotating the plate.

6 Claims, 4 Drawing Figures

FUEL ASSEMBLY LOCKING APPARATUS

CROSS-REFERENCE TO RELATED APPLICATIONS

This application is related to copending U.S. patent applications Ser. No. 268,225 filed May 29, 1981 in the name of P. Pomaibo, et al. entitled "Spent Fuel Consolidation System" and to Ser. No. 268,311 filed May 29, 1981 in the name of M. G. Hicken et al. entitled "Spent Fuel Consolidation System" both of which are assigned to the Westinghouse Electric Corporation.

BACKGROUND OF THE INVENTION

This invention relates to apparatus for locking and holding a nuclear fuel assembly and more particularly to apparatus for locking and holding a nuclear fuel assembly while the fuel rods are removed from the fuel assembly.

After a period of operation of a nuclear reactor, the fuel assemblies comprising the core of the nuclear reactor must be rearranged with the depleted or spent fuel assemblies being replaced with fresh ones. The spent fuel assemblies are removed from the reactor vessel and generally stored in a pool of water on the reactor site. Since a conventional fuel assembly comprises structure other than fuel rods such as grids and control rod guide tubes, a spent fuel assembly occupies more space in the storage pool than would be required for the individual fuel rods. Because the storage pool has a finite volume it would be desirable to be able to store the fuel rods in a closely packed array and with a minimum of support structure to thereby maximize the amount of spent nuclear fuel that can be stored in a given volume of the storage pool. This would provide a greater storage capacity for the spent fuel rods until the fuel rods are transported off the reactor site for storage or reprocessing.

However, since the spent fuel rods have been irradiated during reactor operation, they are highly radioactive and can be handled only by remote manipulators and while the fuel rods are submerged in a coolant. The radioactive nature of the spent fuel assemblies increases the difficulty of not only transporting the spent fuel assembly but of also dismantling the fuel assembly and storing the spent fuel rods.

In order to dismantle or disassemble an irradiated fuel assembly so that the spent fuel rods may be removed from the fuel assembly without damaging the fuel rods, it may be necessary to secure or hold the fuel assembly while the fuel rods are removed. Since the dismantling is performed under water, the fuel assembly must be secured positively and remotely and must, likewise, be able to be released remotely.

Therefore, what is needed is apparatus for remotely and positively securing a fuel assembly under water while the fuel rods are removed therefrom without damaging the fuel assembly or the fuel rods.

SUMMARY OF THE INVENTION

The fuel assembly locking apparatus comprises a rotatable plate capable of simultaneously and positively engaging all four legs of the bottom nozzle of a fuel assembly for uniformly holding the fuel assembly while the spent fuel rods are pulled from the fuel assembly. The rotatable plate has four notched corners arranged to be rotated over a ledge on each leg of the bottom nozzle of the fuel assembly thereby preventing movement of the fuel assembly. The rotatable plate is also capable of being rotated 45° so that the four corners of the plate are rotated clear of the legs of the bottom nozzle of the fuel assembly thereby allowing the fuel assembly to be placed on or removed from the locking apparatus. The locking apparatus is also provided with a torque actuator for remotely rotating the plate.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

When it is desired to consolidate spent fuel rods of a nuclear fuel assembly, it is first necessary to remove fuel rods from the fuel assembly and then rearrange the fuel rods into a compact configuration. The invention described herein provides apparatus for remotely locking and holding a fuel assembly while the spent fuel rods are removed from the fuel assembly.

Figure 1:
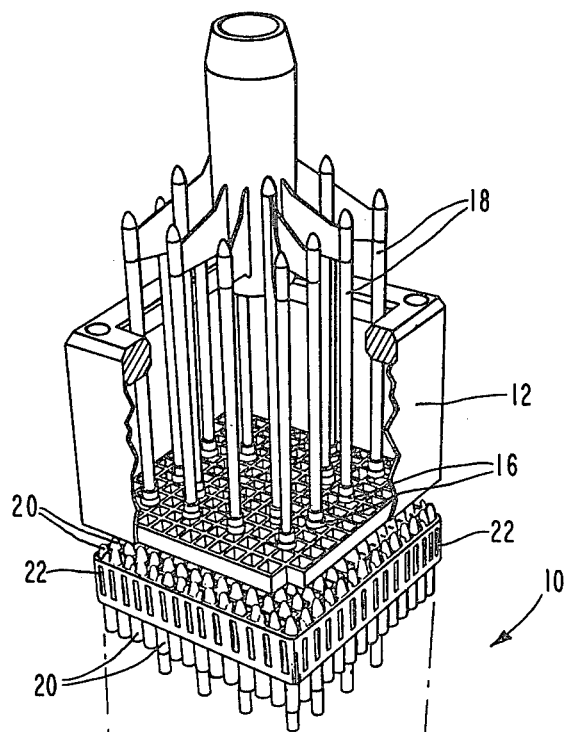
FIG. 1 is a view in perspective of a fuel assembly and control rod arrangement.
Figure 1:
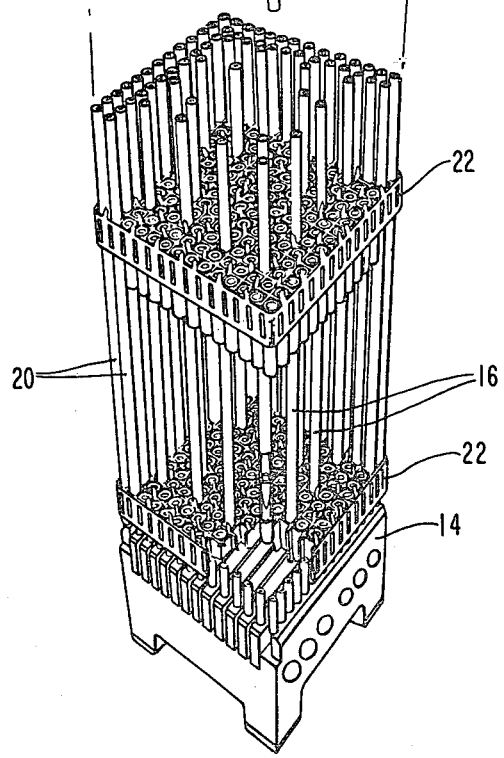

Referring to FIG. 1, a fuel assembly is referred to generally as 10 and comprises a top nozzle 12 and a bottom nozzle 14. A plurality of hollow guide tubes 16 are attached at one end to top nozzle 12 and at the other end to bottom nozzle 14. As is well understood in the art, guide tubes 16 are arranged so that a plurality of control rods 18 may be inserted therein when used in a nuclear reactor. A plurality of fuel rods 20 which may be cylindrical metallic members containing nuclear fuel are arranged in and supported by grids 22. Grids 22 are attached to guide tubes 16 and serve to support and space fuel rods 20 but are not permanently affixed to fuel rods 20. Rather, as is a common practice, fuel rods 20 are held by grids 22 in a spring-clip fashion such that once top nozzle 12 has been removed, fuel rods 20 may be removed from grids 22 in a pulling manner. Since guide tubes 16 are permanently attached to top nozzle 12, grids 22, and bottom nozzle 14, guide tubes 16 provide the structural link between bottom nozzle 14 and fuel rods 20.

After a period of operation of a nuclear reactor, the nuclear fuel in fuel rods 20 becomes depleted or spent so that fuel assemblies 10 must be removed from the nuclear reactor and replaced with fresh ones. Usually, the spent fuel assemblies are transferred from the nuclear reactor to a spent fuel storage pool that is filled with a coolant such as water. The spent fuel assemblies may continue to be stored in the spent fuel storage pool until the pool is filled. However, once the storage pool becomes filled, it then becomes desirable to remove fuel rods 20 from fuel assembly 10 and to store the spent fuel rods 20 in a tightly packed configuration thereby eliminating the support structure of the fuel assembly thus providing a greater volume for storage of fuel rods 20. Such a system for consolidating spent fuel rods is described in copending U.S. patent application Ser. No. 268,225 filed May 29, 1981 in the name of P. Pomaibo et al. entitled "Spent Fuel Consolidation System."

Figure 2:
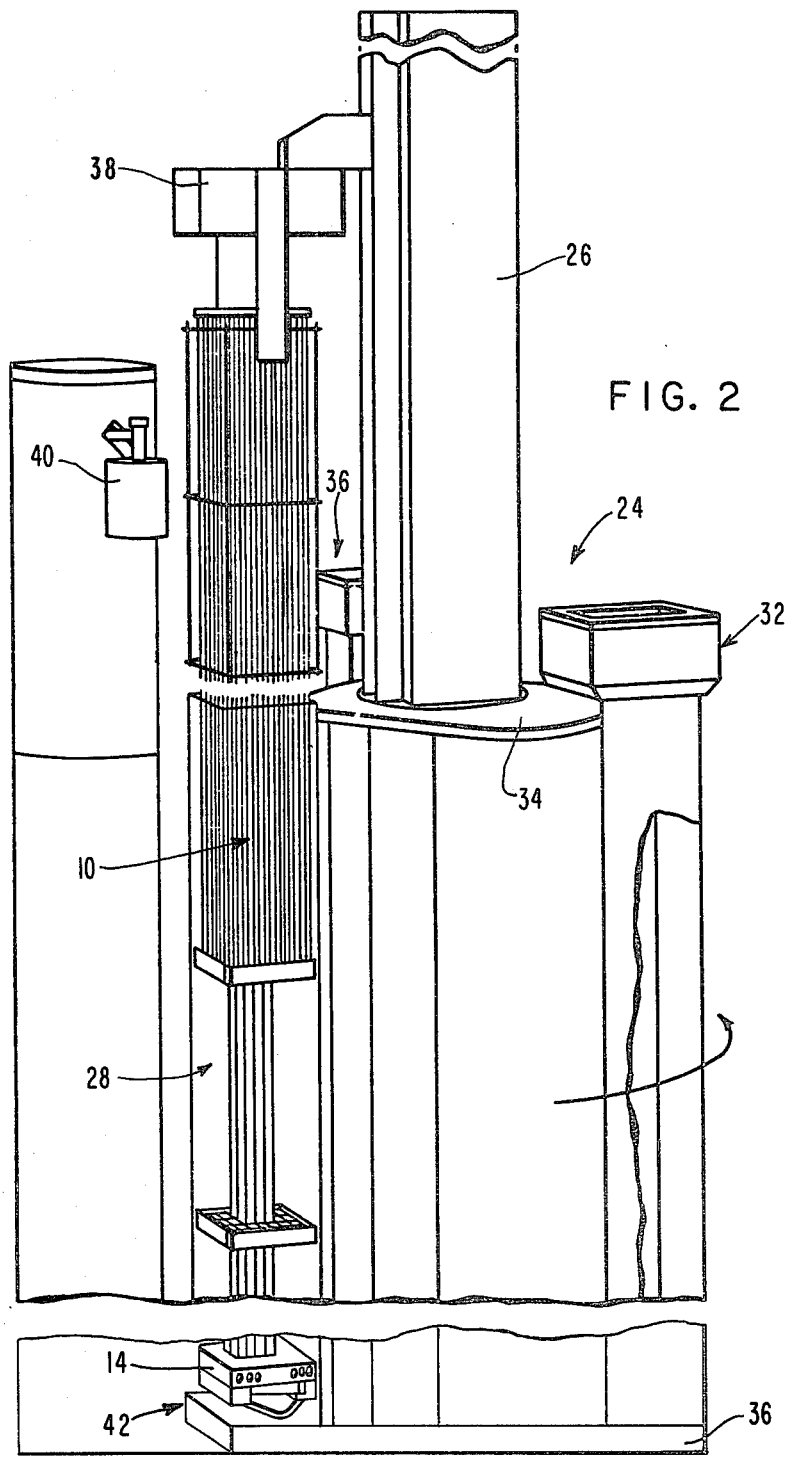
FIG. 2 is a partial view in elevation of a fuel consolidation system.

Referring to FIG. 2, the spent fuel consolidation system comprises a rotatable platform 24 that is capable of rotating about its vertical axis under the influence of a drive system (not shown) and that is capable of operating while completely submerged in a fluid such as water. Platform 24 comprises a vertical support 26, a fuel assembly station 28, a consolidation station 30 and a canister station 32. Fuel assembly station 28, consolidation station 30, and canister station 32 are attached to a first support plate 34 and to a second support plate 36 which are rotatably attached to vertical support 26. Support plates 34 and 36 are arranged such that when they are rotated about vertical support 26, fuel assembly station 28, consolidation station 30 and canister station 32 may be selectively positioned with respect to gripper mechanism 38 which is slidably mounted on vertical support 26. Gripper mechanism 38 may be one chosen from those well known in the art and be capable of pulling a plurality of fuel rods 20 from fuel assembly 10. A nozzle removal mechanism 40 is also arranged near platform 24 for removing top nozzle 12 from fuel assembly 10.

In general, fuel assembly station 28 provides a station for holding spent fuel assembly 10 while top nozzle 12 and spent fuel rods 20 are removed therefrom. Consolidation station 30 provides a station for rearranging fuel rods 20 into a closely packed configuration without the need for the remainder of the fuel assembly support structure. Canister station 32 provides a station for locating a canister for accepting and holding fuel rods 20 after fuel rods 20 have been consolidated by consolidation station 30.

Figure 3:
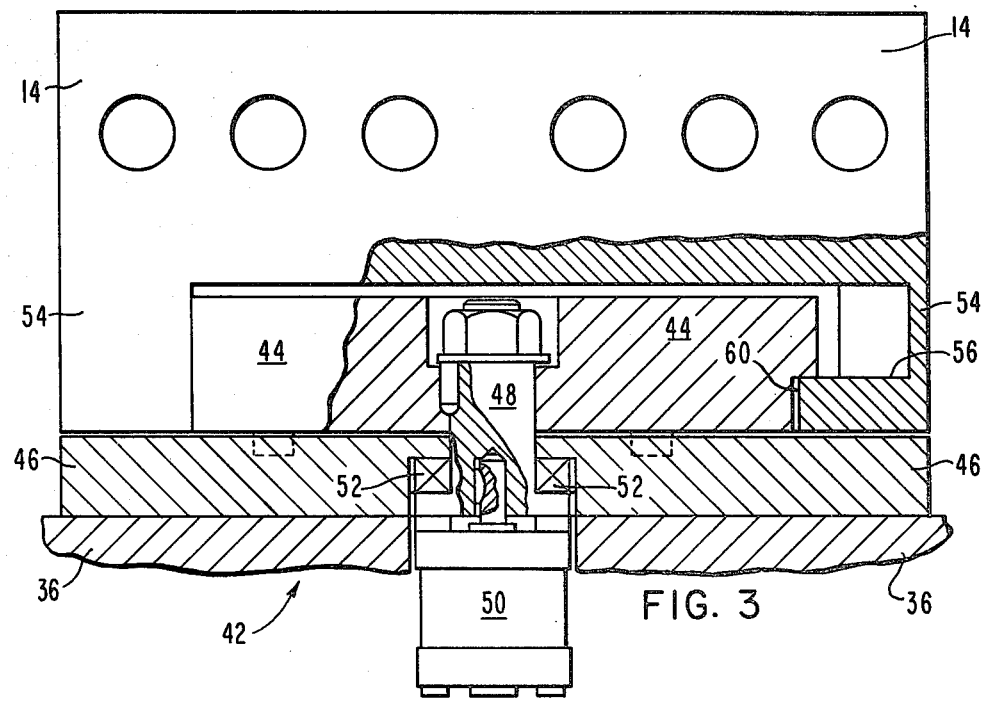
FIG. 3 is a bottom view of a bottom nozzle of a fuel assembly and locking apparatus.
Figure 4:
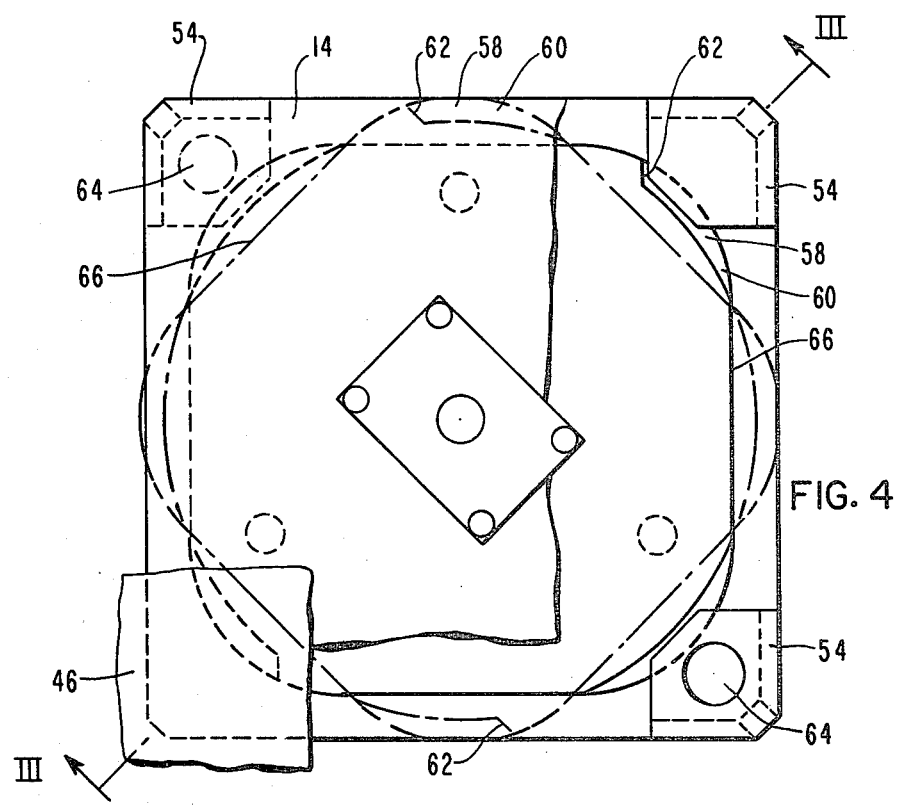
FIG. 4 is a view along line IV—IV of FIG. 3.

Referring now to FIGS. 2-4, a locking mechanism 42 is mounted on second support plate 36 for securing fuel assembly 10 while top nozzle 12 and fuel rods 20 are removed therefrom. Locking mechanism 42 comprises a rotatable plate 44, which may be a substantially square plate, rotatably disposed on support member 46 with support member 46 mounted on second support plate 36. A metal pin 48 is firmly attached to rotatable plate 44, rotatably disposed through support member 46, and attached to rotary actuator 50 for selectively and remotely rotating rotatably plate 44 with respect to bottom nozzle 14 and support member 46. Rotary acuator 50 may be a torque actuator such as one manufactured by Roto Actuator Corporation, St. Clair Shores, Mich. An oil impregnated bronze bushing 52 may be mounted on support means 46 and around pin 48 for enhancing the rotatability of pin 48 in support member 46.

Referring now to FIGS. 3 and 4, bottom nozzle 14 has four legs 54 located at each of the four corners of bottom nozzle 14 for contacting support member 46 and for supporting fuel assembly 10. Each leg 54 has a ledge 56 formed on the inside thereof for engaging rotatable plate 44 thereby securing fuel assembly 10 to support member 46. Rotatable plate 44 is manufactured to have four rounded corners 58 located at 90° from each other and formed so that corners 58 do not extend beyond the edge of bottom nozzle 14. Each corner 58 has a notch 60 that is formed to fit tightly over ledge 56 when rotatable plate 44 is rotated,. At least one of the notches 60 is formed to have a stop 62 at the end thereof to contact ledge 56 and to prevent rotatable plate 44 from rotating beyond leg 54 thereby providing a positive locking mechanism for locking fuel assembly 10 to support member 46. In addition, support member 46 may have a plurality of posts 64 on the top side thereby for being inserted into holes in legs 54 for stabilizing bottom nozzle 14. As can be seen in FIG. 3, when rotatable plate 44 is rotated by rotary actuator 50 into the disengaged position, all four corners 58 are located in a position 45° from engagement with ledge 56. When in this position all four corners 58 are disengaged from legs 54, and legs 54 are free of interference from any portion of rotatable plate 44. This is so because with rotatable plate 44 rotated 45° from the engaged position, the flat sides 66 of rotatable plate 44 are in alignment with legs 54 thereby allowing legs 54 to be freely moved. This, in turn, allows fuel assembly 10 to be remotely lifted from support member 46.

When fuel assembly 10 is remotely placed on support member 46, rotary acutator 50 may be remotely activated thereby causing rotatable plate 44 to rotate approximately 45° in a clockwise motion as viewed in FIG. 3. The rotation of rotatable plate 44 causes all four notches 60 to engage all four ledges 56 simultaneously thereby locking all four legs 54 to support member 46. Of course, since support member 46 may be integral with or may be one in the same with second support plate 36, this action causes fuel assembly 10 to become firmly and positively secured to second support plate 36. In this manner, fuel assembly 10 may be secured to platform 24 of a fuel consolidation system. With fuel assembly 10 securely held by locking mechanism 42, fuel rods 20 may be pulled from fuel assembly 10 by gripper mechanism 38 without interference from the locking mechanism 42. By holding fuel assembly 10 from all four legs 54 of bottom nozzle 14, locking mechanism 42 exerts an even and balanced force on fuel assembly 10 while fuel rods 120 are pulled therefrom. The balanced force prevents bending or twisting of fuel rods 20 or fuel assembly 10 while fuel rods 20 are removed while applying sufficient force to restrain fuel assembly 10. In addition, locking mechanism 42 prevents rotation of fuel assembly 10 during the extraction of fuel rods 20 without interferring with the extraction of fuel rods 20 and without damaging fuel rods 20 or fuel assembly 10.

Therefore, the invention provides a locking mechanism for holding a fuel assembly while the fuel rods are extracted therefrom.

We claim as our invention:

1. Apparatus for locking and holding a nulcear fuel assembly while fuel rods are extracted from said fuel assembly and while said fuel assembly remains submerged in fluid, said fuel assembly having a bottom nozzle with a plurality of legs attached thereto with each other of said legs having a ledge thereon, said apparatus comprising:

a vertical support;

a gripper mechanism slidably mounted on said vertical support for gripping and extracting said fuel rods from said fuel assembly;

a support member rotatably attached to said vertical support and capable of having said legs of said fuel assembly disposed thereon for supporting the weight of said fuel assembly and for rotating said fuel asembly around said vertical support;

a substantially square rotatable plate disposed on said support member and having at least four corners with each of said corners having a notch therein for simultaneously engaging each of said ledges of said legs of said fuel assembly;

a pin firmly attached to said rotatable plate and rotatably disposed through said support member;

a bushing disposed in said support member and around said pin for enhancing the rotatability of said pin; and a rotary actuator connected to said pin for selectively remotely rotating said rotatable plate relative to said support member and to said legs of said fuel assembly for locking and holding said fuel assembly to said support member while said fuel rods are extracted from said fuel assembly.

2. The apparatus according to claim 1 wherein each of said corners are rounded for permitting engagement with said legs.

3. The apparatus according to claim 2 wherein at least one of said notches has a stop as a part thereof for preventing over-rotation of said rotatable plate.

4. The apparatus according to claim 3 wherein said rotary actuator is a torque actuator.

5. The apparatus according to claim 4 wherein said bushing is a bronze bushing.

6. The apparatus according to claim 5 wherein said fluid is water.

* * * * *